US009938810B2

(12) United States Patent
Nguyen et al.

(10) Patent No.: US 9,938,810 B2
(45) Date of Patent: Apr. 10, 2018

(54) CONDUCTIVITY ENHANCEMENT OF COMPLEX FRACTURE NETWORKS IN SUBTERRANEAN FORMATIONS

(71) Applicant: Halliburton Energy Services, Inc., Houston, TX (US)

(72) Inventors: Philip D. Nguyen, Houston, TX (US); Loan K. Vo, Houston, TX (US); Thomas Zachary Vonk, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 145 days.

(21) Appl. No.: 14/786,901

(22) PCT Filed: Sep. 16, 2013

(86) PCT No.: PCT/US2013/059843
§ 371 (c)(1),
(2) Date: Oct. 23, 2015

(87) PCT Pub. No.: WO2015/038153
PCT Pub. Date: Mar. 19, 2015

(65) Prior Publication Data
US 2016/0076352 A1 Mar. 17, 2016

(51) Int. Cl.
*E21B 43/267* (2006.01)
*C09K 8/72* (2006.01)
(Continued)

(52) U.S. Cl.
CPC ............ *E21B 43/267* (2013.01); *C09K 8/72* (2013.01); *C09K 8/74* (2013.01); *C09K 8/80* (2013.01)

(58) Field of Classification Search
None
See application file for complete search history.

(56) References Cited

U.S. PATENT DOCUMENTS 3,938,593 A   2/1976  Friedman
3,998,272 A * 12/1976  Maly ..................... C09K 8/76
                                              166/281

(Continued)

FOREIGN PATENT DOCUMENTS

WO    2015038153 A1   3/2015

OTHER PUBLICATIONS

Fredd et al., Experimental Study of Fracture Conductivity for Water-Fracturing and Conventional Fracturing Applications, SPE 74138-PA, SPE Journal, Sep. 2001.
(Continued)

*Primary Examiner* — Anuradha Ahuja
(74) *Attorney, Agent, or Firm* — McDermott Will & Emery LLP

(57) ABSTRACT

Some embodiments provide a method comprising a) introducing a delayed-release acid and a gelling agent into a subterranean formation at a rate and pressure sufficient to create or enhance at least one fracture in a first treatment interval; b) contacting the delayed-release acid with a face of the fracture in the first treatment interval so as to etch one or more channels thereon; c) introducing a combination of non-degradable and degradable micro-proppant particulates into the subterranean formation so as to place them into the fracture in the first treatment interval, wherein they at least partially inhibit fluid flow therethrough; d) introducing a combination of non-degradable and degradable proppant particulates into the subterranean formation so as to place them into the fracture in the first treatment interval, wherein they at least partially inhibit fluid flow therethrough; e) repeating (a) through (d) at a second treatment interval.

18 Claims, 1 Drawing Sheet

(51) Int. Cl.
*C09K 8/80* (2006.01)
*C09K 8/74* (2006.01)

(56) References Cited

U.S. PATENT DOCUMENTS

| | | | |
|---|---|---|---|
| 4,320,014 A | 3/1982 | Vivian | |
| 5,905,061 A | 5/1999 | Patel | |
| 5,977,031 A | 11/1999 | Patel | |
| 6,207,620 B1* | 3/2001 | Gonzalez | C09K 8/72 166/307 |
| 6,488,091 B1 | 12/2002 | Weaver et al. | |
| 6,725,933 B2 | 4/2004 | Middaugh et al. | |
| 6,828,279 B2 | 12/2004 | Patel et al. | |
| 6,897,334 B2 | 5/2005 | Vennerstrom | |
| 7,004,255 B2 | 2/2006 | Boney | |
| 7,148,184 B2 | 12/2006 | Francini et al. | |
| 7,166,560 B2 | 1/2007 | Still et al. | |
| 7,168,489 B2* | 1/2007 | Frost | C09K 8/02 166/278 |
| 7,431,089 B1* | 10/2008 | Couillet | C09K 8/72 166/307 |
| 7,534,745 B2 | 5/2009 | Taylor et al. | |
| 7,621,334 B2 | 11/2009 | Welton et al. | |
| 7,645,723 B2 | 1/2010 | Kirsner et al. | |
| 7,696,131 B2 | 4/2010 | Oyler et al. | |
| 7,704,927 B2* | 4/2010 | Qu | C09K 8/68 166/305.1 |
| 7,784,541 B2* | 8/2010 | Hartman | C09K 8/536 166/280.1 |
| 8,006,760 B2 | 8/2011 | Fleming et al. | |
| 8,163,826 B2* | 4/2012 | Willberg | C09K 8/52 524/293 |
| 8,196,662 B2 | 6/2012 | Plasier et al. | |
| 2004/0106525 A1* | 6/2004 | Willberg | C09K 8/03 507/200 |
| 2004/0152601 A1* | 8/2004 | Still | C09K 8/03 507/100 |
| 2005/0194141 A1* | 9/2005 | Sinclair | C09K 8/805 166/280.2 |
| 2006/0113077 A1* | 6/2006 | Willberg | C09K 8/42 166/280.1 |
| 2006/0157243 A1* | 7/2006 | Nguyen | C09K 8/805 166/280.2 |
| 2006/0175059 A1* | 8/2006 | Sinclair | C09K 8/805 166/283 |
| 2006/0185848 A1* | 8/2006 | Surjaatmadja | C09K 8/68 166/280.2 |
| 2007/0123433 A1 | 5/2007 | Sarkar et al. | |
| 2007/0187096 A1* | 8/2007 | Pauls | C09K 8/74 166/280.1 |
| 2008/0119374 A1* | 5/2008 | Willberg | C09K 8/52 507/209 |
| 2008/0139412 A1* | 6/2008 | Fuller | C09K 8/52 507/219 |
| 2009/0025933 A1* | 1/2009 | Garcia-Lopez de Victoria | C09K 8/528 166/279 |
| 2009/0025934 A1* | 1/2009 | Hartman | C09K 8/536 166/280.2 |
| 2009/0084554 A1 | 4/2009 | Williamson et al. | |
| 2009/0281005 A1* | 11/2009 | Qu | C09K 8/68 507/237 |
| 2010/0300688 A1* | 12/2010 | Panga | C09K 8/80 166/280.2 |
| 2011/0005753 A1* | 1/2011 | Todd | C09K 8/506 166/282 |
| 2011/0180259 A1* | 7/2011 | Willberg | C09K 8/68 166/280.2 |
| 2012/0111563 A1* | 5/2012 | Abad | C09K 8/03 166/276 |
| 2012/0247764 A1* | 10/2012 | Panga | C09K 8/70 166/280.2 |

OTHER PUBLICATIONS

Warpinski et al., Stimulating Unconventional Reservoirs: Maximizing Network Growth While Optimizing Fracture Conductivity, JCPT, Oct. 2009, vol. 48 No. 10, SPE 114173.

Warpinski, N.R., Stress Amplification and Arch Dimensions in Proppant Beds Deposited by Waterfracs, SPE Production & Operations, 2010, SPE 119350.

Kassis et al., Fracture Permeability of Gas Shale: Effects of Roughness, Fracture Offset, Proppant, and Effective Stress, SPE 131376-MS, 2010.

International Search Report and Written Opinion for PCT/US2013/059843 dated Jun. 20, 2014.

\* cited by examiner

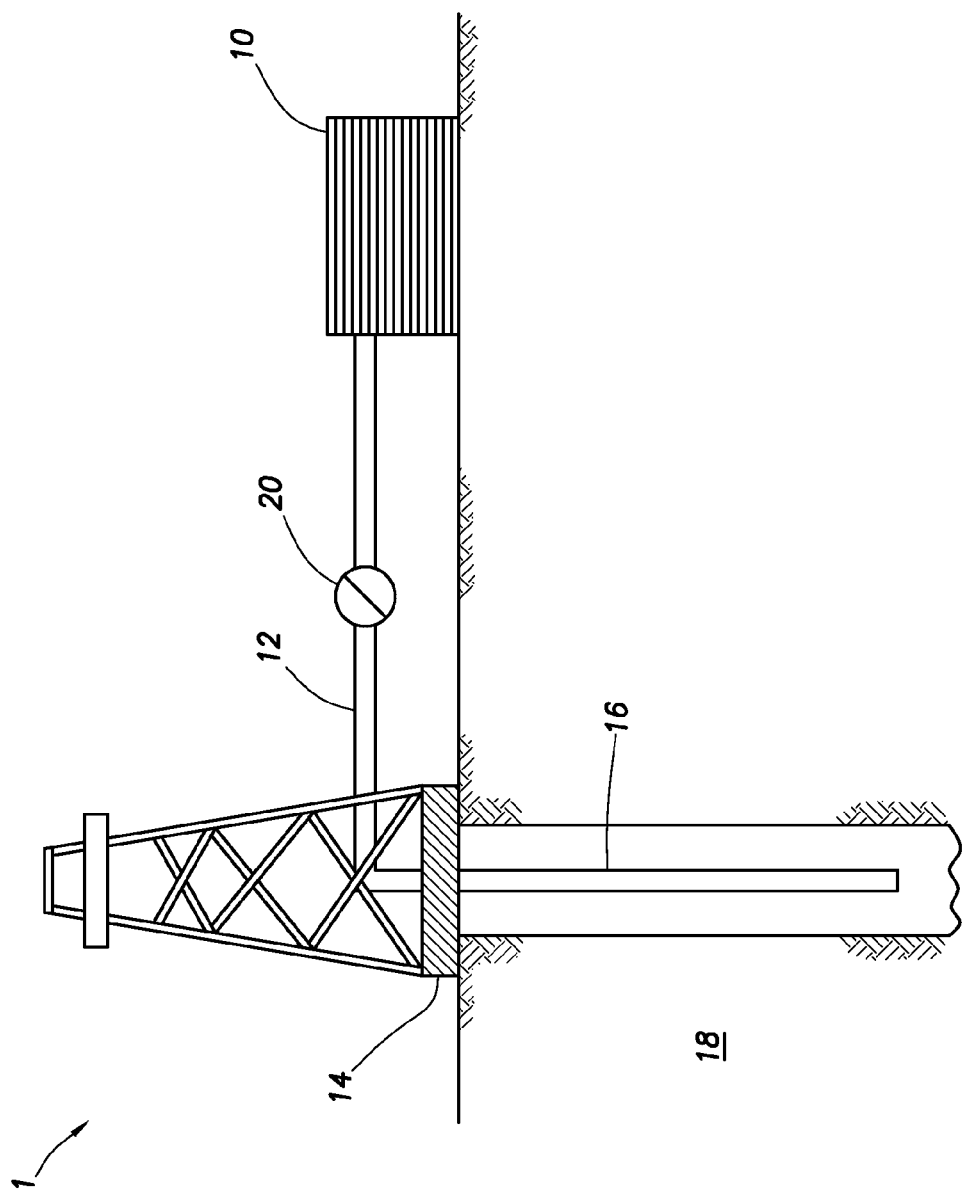

CONDUCTIVITY ENHANCEMENT OF COMPLEX FRACTURE NETWORKS IN SUBTERRANEAN FORMATIONS

BACKGROUND

The disclosure of embodiments herein relates to enhancing the conductivity of complex fracture networks in subterranean formations.

Subterranean wells (e.g., hydrocarbon producing wells, gas producing wells, water producing wells, and the like) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein as "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") serve to prevent the fractures from fully closing once the hydraulic pressure is removed. By keeping the fractures from fully closing, the proppant particulates aid in forming conductive paths through which fluids produced from the formation flow, referred to as a "proppant pack." The degree of success of a stimulation operation depends, at least in part, upon the porosity of the proppant pack, that is, due to the flow of fluids through interconnected interstitial spaces between abutting proppant particulates.

In the case of stimulating low permeability formations (or "low permeability formations"), such as shale reservoirs or tight-gas sands, increasing fracture complexity during stimulation may enhance the production of the formation. Low permeability formations, as described herein, tend to have a naturally occurring network of multiple interconnected fractures referred to as "fracture complexity." As used herein the term low permeability formations refers to formations that have a matrix permeability less than 1,000 microDarcy (equivalent to 1 milliDarcy). The term "ultra-low permeability formations" that have a matrix permeability less than 1 microDarcy (equivalent to 0.001 milliDarcy). As used herein, the term "fracture" or "fractures" refers collectively to micro-sized fractures and fractures having larger openings. Such fracture complexity may be enhanced by stimulation (e.g., fracturing) operations to create new or enhance (e.g., elongate or widen) existing fractures. In such cases, the newly formed fractures may remain open without the assistance of proppant or micro-proppant particulates due to shear offset of the formation forming the fracture or may have included therein proppant or micro-proppant particulates, depending on the size of the fracture, to assist in keeping the fracture open after hydraulic pressure is removed. The inclusion of proppant or micro-proppant particulates in the fractures, new or natural, may increase the conductivity of the low permeability formation.

In some cases, subterranean treatment operations (e.g., stimulation, proppant placement, micro-proppant placement, and the like), may be supplemented with enhanced oil recovery techniques. Such enhanced oil recovery techniques may operate to enhance the conductivity of fractures. One such technique is acidizing, which involves injecting an acid (e.g., hydrochloric acid) into a subterranean formation in order to etch channels or create micro-fractures in the face of the formation or a fracture in order to enhance the conductivity of the formation. The acid may create a dendritic-like network of channels through which produced fluids may flow.

Acidizing may operate to supplement or enhance the conductivity and production of the formation. Acidizing treatments are preferentially performed at multiple intervals or zones in a subterranean formation so as to maximize fracture complexity. However, such multiple interval treatments may be limited due to acid spending or leak off. If the acid is spent or experiences leak off prior to reaching one or more desired interval of the subterranean formation (e.g., by leak off in a first or earlier contacted desired interval), it may be insufficiently potent to etch channels and, thus, may not contribute to or may only minimally contribute to enhancing fracture complexity and conductivity.

BRIEF DESCRIPTION OF THE DRAWINGS

The following figures are included to illustrate certain embodiments disclosed herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 provides an illustrative schematic of a system that can deliver acidizing treatments of the embodiments disclosed herein to a downhole location.

DETAILED DESCRIPTION

The disclosure of embodiments herein relates to enhancing the conductivity of complex fracture networks in subterranean formations. Specifically, embodiments described herein relate to enhancing fracture complexity using delayed-release acids, or delayed acidizing reactants and delayed acidizing corresponding salts. The embodiments further describe non-degradable and degradable proppant and micro-proppant particulates that may be used to divert the acid materials to desired intervals so as to further enhance fracture conductivity. As used herein, the term "non-degradable particulates" may be used to collectively refer to both the non-degradable proppant particulates and the non-degradable micro-proppant particulates and the term "degradable particulates" may be used collectively to refer to both the degradable proppant particulates and the degradable micro-proppant particulates.

In some embodiments described herein, the delayed-release acid is used to create or enhance fractures or micro-fractures in a subterranean formation. The acid may etch channels within the faces of the fractures, thereby increasing the conductivity of the fracture. The degradable and non-degradable micro-proppant and proppant particulates may then be placed within the fracture or micro-fracture so as to cause the acid to divert to a second area of the subterranean formation, such as a second fracture or micro-fracture. The acid may then etch the face of the second fracture or micro-fracture. This may be repeated so as to cause the acid to etch channels in fractures at different intervals by diverting the acid using the degradable and non-degradable micro-proppant and proppant particulates described herein. Thus, the embodiments described herein may be used to enhance fracture complexity within a subterranean formation.

It should be noted that in some numerical listings of ranges, some lower limits listed may be greater than some upper limits listed. One skilled in the art will recognize that the selected subset will require the selection of an upper limit in excess of the selected lower limit.

Unless otherwise indicated, all numbers expressing quantities of ingredients, sizes, and so forth used in the present specification and associated claims are to be understood as being modified in all instances by the term "about." It should be noted that when "about" is provided herein at the beginning of a numerical list, "about" modifies each number of the numerical list. Accordingly, unless indicated to the contrary, the numerical parameters set forth in the following specification and attached claims are approximations that may vary depending upon the desired properties sought to be obtained by the embodiments in the disclosure. Some lower limits listed may be greater than some upper limits listed and one skilled in the art will recognize that the selected subset will require the selection of an upper limit in excess of the selected lower limit. At the very least, and not as an attempt to limit the application of the doctrine of equivalents to the scope of the claim, each numerical parameter should at least be construed in light of the number of reported significant digits and by application of ordinary rounding techniques.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

Increasing fracture complexity in subterranean formations, particularly in tight subterranean formations, may increase the conductivity and productivity of the formation. The permeability of a formation is a measure of the formation's resistance to through-flow fluid. Thus, low permeability formations require considerable applied pressure in order to flow fluid through its pore spaces, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). Tight-gas sands are low permeability formations that produce mainly dry natural gas and may include tight-gas carbonates, tight-gas shales, coal-bed methane, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

In some embodiments, a method is disclosed herein comprising introducing a delayed acidizing reactant into a subterranean formation at a rate and pressure sufficient to create or enhance at least one first fracture in a first treatment interval. A delayed acidizing corresponding salt is introduced into the subterranean formation at a rate and pressure sufficient to create or enhance at least one second fracture in the first treatment interval. The delayed acidizing reactant is contacted with the delayed acidizing corresponding salt so as to form a delayed-release acid and in situ release acid and etch one or more channels into a face of the first fracture and/or the second fracture. A combination of non-degradable micro-proppant particulates and degradable micro-proppant particulates are introduced into the formation and placed into the first fracture and/or the second fracture, so as to at least partially inhibit fluid flow therethrough. A combination of non-degradable proppant particulates and degradable proppant particulates are introduced into the formation and placed into the first fracture and/or the second fracture, so as to further at least partially inhibit fluid flow therethrough. The non-degradable and degradable micro-proppant particulates may be placed into the fracture(s) before the larger sized non-degradable and degradable proppant particulates to become located in the tips of the fracture(s) or other far field regions within the fracture(s) that are generally small in size. Alternatively or in addition thereto, the non-degradable and degradable proppant particulates may be placed into the fracture(s) after the non-degradable and degradable micro-proppant particulates to fill areas in larger-sized fracture branches that do not or cannot comprise the micro-proppant particulates. As such, the micro-proppant particulates and the proppant particulates used in combination may be capable of being located in an increased portion of the fracture(s) than either used alone, thus providing a greater number of conductive channels to facilitate production of the formation once production is begun and the degradable micro-proppant particulates and degradable proppant particulates are degraded. Prior to production, the particulates at least partially inhibit fluid by compacting the degradable and non-degradable micro-proppant particulates into the tips of the fracture followed by addition of the larger degradable and non-degradable proppant particulates. The interstitial spaces between the degradable and non-degradable micro-proppant particulates are small enough to inhibit flow therethrough, thus allowing a second acidizing treatment to be repeated at a second treatment interval with minimal leak off into the first treatment interval. Additionally, the degradable micro-proppant particulates and degradable proppant particulates may be degraded so as to form or enhance interstitial spaces between the non-degradable micro-proppant particulates and the non-degradable proppant particulates contained within the fracture(s) through which produced fluids may flow.

The delayed-release acid is capable of releasing acid to etch channels into one or more surfaces of a fracture(s) or the subterranean formation itself. The delayed-release acid is preferably introduced into the subterranean formation such that the release of acid is sufficiently delayed to permit injection through the subterranean formation to the treatment interval of interest without substantial leak off of the acid. In the embodiments disclosed herein, the action of the delayed-release acid may be delayed by introducing a two component in situ acid generating composition that remains inert or relatively inert until the two components are contacted together. Such delay may be achieved in the embodiments herein by introducing a delayed acidizing reactant and a delayed acidizing corresponding salt as separate components, which may be introduced in any order. Within the formation, preferably at a desired treatment interval, the delayed acidizing corresponding salt may be contacted and reacted with the delayed acidizing reactant so as to form the delayed-release acid, which may then release of acid in situ in the formation. In other embodiments, the delayed-release acid may be encapsulated with a coating in order to enhance the delayed release. The encapsulation may be a porous coating through which the delayed-release acid diffuses slowly, may be an impermeable coating that degrades in the subterranean formation (e.g., due to temperature conditions), may be an impermeable coating that is brittle and removable due to fracture closure pressures or other pressures, or any other diffusible or removable (e.g., by degradation or other means) coating. The encapsulation material may be any material that achieves the desired result, such as, for example, a polymer; a wax; a hardened resin; and any combination thereof. In still other embodiments, the delayed-release acid may be introduced into a subterranean formation in a base fluid further comprising a gelling agent. The gelling agent may enhance the delayed release of the acid by hindering leak off, for example. Any combination of these treatment methods may be utilized (e.g., two component formation of the delayed-release acid, encapsulation of the delayed-release acid, or inclusion of a gelling agent with the delayed-release acid) to achieve acid etching and acid diversion to enhance fracture complexity in the subterranean formation being treated. For example, the two component treatment may be introduced into the subterranean formation before or after any one of the single component treatments. Additionally, the single component treatments may be introduced subsequently or at the same time into a subterranean formation. One of ordinary skill in the art, with the benefit of this disclosure, will recognize whether any such combination of treatments may be desired depending on, for example, the type of subterranean formation being treated, the type of delayed-release acid selected to be formed, and the like.

The delayed-release acid for use in the embodiments described herein may be any acid capable of providing a delayed release of acid in a base fluid. Suitable delayed-release acids may be organic or inorganic. Suitable such acids include but are not limited to acetic acid; hydrofluoric acid; hydrochloric acid; formic acid; lactic acid; phosphoric acid; sulfamic acid; p-toluenesulfonic acid; any derivative thereof; and any combination thereof. In some embodiments, the delayed-release acid is present in an amount in the range of from an upper limit of about 50%, 40%, 30%, 20%, 10%, and 5% to a lower limit of about 0.1%, 0.5%, 1%, 2%, 3%, 4%, and 5% by volume of a base fluid. In other embodiments, the delayed-release acid may be present in an amount in the range of from about 0.1% to about 35% by volume of a base fluid.

In some embodiments, the delayed-release acid may be formed by the reaction product of a delayed acidizing reactant and a delayed acidizing corresponding salt. The delayed acidizing reactant may be selected from the group consisting of a sulfonate ester (e.g., a methyl methanesulfonate ester); a phosphate ester; an orthoformate; an orthoacetate; a citric acid ester; and any combination thereof. Moreover, in some embodiments, the delayed-release acid itself may be used as a delayed acidizing reactant which may react with the delayed acidizing corresponding salt in order to form the delayed-release acid.

Specific sulfonate esters may include, but are not limited to, methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; an ethyl methanesulfonate); any derivative thereof; and any combination thereof. Suitable phosphate esters may include alone or in combination mono, di-, and tri-phosphate esters. Specific phosphate esters may include, but are not limited to, methyl phosphate; dimethyl phosphate; trimethyl phosphate; ethyl phosphate; diethyl phosphate; triethyl phosphate; butyl phosphate; dibutyl phosphate; tributyl phosphate; 2-ethylhexyl phosphate; 2-diethyhexyl phosphate; tri(2-ethylhexyl)phosphate; butoxyethyl phosphate; dibutoxyethyl phosphate; tributoxyethyl phosphate; phenyl phosphate; diphenyl phosphate; triphenyl phosphate; cresyl phosphate; dicresyl phosphate; tricredyl phosphate, xylenyl phosphate, dixylenyl phosphate, trixylenyl phosphate, isopropylphenyl phosphate; bis(isopropylphenyl)phosphate; tris(isopropylphenyl)phosphate; (phenylphenyl)phosphate; bis(phenylphenyl)phosphate; tris (phenylphenyl)phosphate; naphthyl phosphate; dinaphthyl phosphate; trinaphthyl phosphate; cresyldiphenyl phosphate; xylenyl diphenyl phosphate; diphenyl(2-ethylhexyl) phosphate; di(isopropylphenyl)phenylphosphate; monoisodecyl phosphate; 2-acryloyloxyethyl acid phosphate; 2-methacryloyloxyethyl acid phosphate; diphenyl-2-acryloyloxyethyl phosphate; diphenyl-2-methacryloyloxyethyl phosphate; melamine phosphate; dimelamine phosphate; poly(oxy-1,2-ethanediyl); alpha-tridecyl-omega-hydroxy phosphate; melamine pyrophosphate; any derivative thereof; and any combination thereof. Examples of suitable orthoformates may include, but are not limited to, trimethyl orthoformate; triethyl orthoformate; tripropyl orthoformate; triisopropyl orthoformate; tributyl orthoformate; a poly(orthoformate); any derivative thereof; and any combination thereof. Suitable orthoacetates may include, but are not limited to, trimethyl orthoacetate; triethyl orthoacetate; tripropyl orthoacetate; triisopropyl orthoacetate; tributyl orthoacetate; a poly(orthoacetate); any derivative thereof; and any combination thereof. Specific citric acid esters include, but are not limited to, a triethyl citrate; an acetyl triethyl citrate; a tributyl citrate; an acetyl tributyl citrate; any derivative thereof; and any combination thereof.

In some embodiments, the delayed acidizing reactant may be present in an amount in the range of from about 0.1% to about 50% by volume of a base fluid. In other embodiments, the delayed acidizing reactant may be present in an amount in the range of from about 0.1% to about 35% by volume of a base fluid.

The delayed acidizing corresponding salt for use in the embodiments described herein may be selected to react with the delayed acidizing reactant so as to form the delayed-release acid. Suitable delayed acidizing corresponding salts include, but are not limited to, a fluoride salt (e.g., ammonium bifluoride and sodium fluoride); a chloride salt; and any combination thereof. In some embodiments, the delayed acidizing corresponding salt may be present in an amount in the range of from an upper limit of about 50%, 40%, 30%, 20%, 10%, and 5% to a lower limit of about 0.1%, 0.5%, 1%, 2%, 3%, 4%, and 5% by volume of a base fluid. In other embodiments, the delayed acidizing corresponding salt may be present in an amount in the range of from about 0.1% to about 35% by volume of a base fluid.

In some embodiments described herein, degradable and non-degradable proppant particulates and degradable and non-degradable micro-proppant particulates are introduced into a subterranean formation to prop open fractures created therein. The purpose of these particulates is to at least partially inhibit fluid flow into the fracture(s) in which they are placed so as to achieve acid diversion and enhanced fracture conductivity, and are thusly sized differently in order to facilitate that purpose. The proppant particulates and the micro-proppant particulates therefore may be comprised of the same types of materials and only differ in size. The non-degradable and degradable micro-proppant particulates have an average size of less than about 100 mesh, U.S. Sieve Series. The non-degradable and degradable proppant particulates have an average size larger than that of the micro-proppant particulates, typically in the range of greater than about 100 mesh to about 2 mesh, or even less, U.S. Sieve Series. In some embodiments, the non-degradable and degradable proppant particulates may be present in combination in an amount in the range of from an upper limit of about 10 ppg, 9 ppg, 8 ppg, 7 ppg, 6 ppg, and 5 ppg, 4 ppg, 3 ppg, 2 ppg, and 1 ppg to a lower limit of about 0.01 ppg, 0.1 ppg, 0.2 ppg, 0.3 ppg, 0.4 ppg, 0.5 ppg, 0.6 ppg, 0.7 ppg, 0.8 ppg, 0.9 ppg, and 1 ppg of a base fluid, and wherein the degradable proppant particulates are present in an amount in the range of from an upper limit of about 70%, 65%, 60%, 55%, 50%, and 45% to a lower limit of about 20%, 25%, 30%, 35%, 40%, and 45% of the combined total volume of the non-degradable and degradable proppant particulates. In some embodiments, the non-degradable and degradable micro-proppant particulates may be present in combination in an amount in the range of from an upper limit of about 10 ppg, 9 ppg, 8 ppg, 7 ppg, 6 ppg, and 5 ppg, 4 ppg, 3 ppg, 2 ppg, and 1 ppg to a lower limit of about 0.01 ppg, 0.1 ppg, 0.2 ppg, 0.3 ppg, 0.4 ppg, 0.5 ppg, 0.6 ppg, 0.7 ppg, 0.8 ppg, 0.9 ppg, and 1 ppg of a base fluid, and wherein the degradable micro-proppant particulates are present in an amount in the range of from an upper limit of about 70%, 65%, 60%, 55%, 50%, and 45% to a lower limit of about 20%, 25%, 30%, 35%, 40%, and 45% of the combined total volume of the non-degradable and degradable micro-proppant particulates.

The non-degradable proppant particulates and the non-degradable micro-proppant particulates disclosed in some embodiments herein may comprise any material suitable for use in a subterranean formation operation. Suitable materials for these non-degradable particulates include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The non-degradable particulates may be of any known shape of material, including substantially spherical materials; fibrous materials; polygonal materials (e.g., cubic materials); and any combination thereof.

The degradable proppant particulates and the degradable micro-proppant particulates may be any material capable of degradation in situ by conditions of the subterranean formation (e.g., a polymer with a melting point that will cause it to dissolve at the temperature of the subterranean formation into which it is placed), an external degradation agent, or any other method. In some embodiments, the degradable proppant particulates and the degradable micro-proppant particulates are degraded after acidizing in order to increase permeability within one or more propped fractures. In some embodiments, the degradable particulates degrade slowly over time as opposed to instantaneously.

In some embodiments, the degradable particulates may be oil-degradable, such that they may be degraded by the produced fluids. The degradable particulates may also be degraded by materials purposely placed in the formation by injection, mixing the degradable particulates with delayed reaction degradation agents, or other suitable means to induce degradation. Suitable materials for forming the degradable particulates that are oil-degradable include natural oil-degradable polymers; synthetic oil-degradable polymers; and any combination thereof. Specific oil-degradable polymers include, but are not limited to, polyacrylics; polyamides; polyolefins (e.g., polyethylene, polypropylene, polyisobutylene, and polystyrene); and any combination thereof.

In addition to oil-degradable polymers, other degradable materials that may be used as the degradable particulates described herein include, but are not limited to, degradable polymers; dehydrated salts; and any combination thereof. As for degradable polymers, a polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent, for example, on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., temperature, presence of moisture, oxygen, microorganisms, enzymes, pH, and the like).

Suitable examples of degradable polymers that may be used to form the degradable particulates described herein include polysaccharides (e.g., dextran or cellulose); chitins; chitosans; proteins; aliphatic polyesters; poly(lactides); poly (glycolides); poly($\epsilon$-caprolactones); poly(hydroxybutyrates); poly(anhydrides) (e.g., poly(adipicanhydride), poly (subericanhydride), poly(sebacicanhydride), poly (dodecanedioic anhydride), poly(maleic anhydride), or poly (benzoicanhydride)); aliphatic or aromatic polycarbonates; poly(orthoesters); poly(aminoacids); poly(ethylene oxides); and polyphosphazenes. Of these suitable polymers, aliphatic polyesters and polyanhydrides may be preferred.

Dehydrated salts may be used to form the degradable particulates disclosed herein, particularly when the base fluid selected comprises an aqueous component. A dehydrated salt is suitable for use as the degradable particulates if it degrades over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax); anhydrous boric acid; and any combination thereof. These anhydrous borate materials are only slightly soluble in water. However, with time and heat in a subterranean environment, the anhydrous borate materials react with the surrounding aqueous fluids and are hydrated. The resulting hydrated borate materials are highly soluble in such aqueous fluids and as a result degrade therein. In some instances, the total time required for the anhydrous borate materials to degrade in an aqueous fluid is in the range of from about 8 hours to about 72 hours, depending upon the temperature of the subterranean zone in which they are placed. Other examples include organic or inorganic salts, such as acetate trihydrate.

Blends of certain degradable materials may also be suitable for use as the degradable particulates of the present invention. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the subterranean formation and production of any of the fluids therefrom.

In choosing the appropriate degradable material for use as the degradable particulates disclosed herein, one should consider the degradation products that will result. These degradation products should not adversely affect other operations or components and may even be selected to improve the long-term performance/conductivity of the subterranean formation. The choice of degradable material also can depend, at least in part, on the conditions of the well (e.g., well bore temperature). For instance, lactides have been found to be suitable for lower temperature wells, including those within the range of 15.6° C. (60° F.) to 65.6° C. (150° F.), and polylactides have been found to be suitable for well bore temperatures above this range. Also, poly (lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, the delayed-release acid may be introduced into the subterranean formation at a rate and pressure sufficient to create or enhance at least one fracture in a first treatment interval along with a gelling agent. The gelling agent may enhance the delayed release of acid. The gelling agents suitable for use in the embodiments described herein may comprise any substance (e.g. a polymeric material) capable of increasing the viscosity of a base fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; or a combination thereof. The gelling agents also may be cationic gelling agents; anionic gelling agents; or a combination thereof. Suitable gelling agents include, but are not limited to, polysaccharides; biopolymers; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and any combination thereof.

Suitable synthetic polymers include, but are not limited to, 2,2'-azobis(2,4-dimethylvaleronitrile); 2,2'-azobis(2,4-dimethyl-4-methoxyvaleronitrile); polymers and copolymers of acrylamide ethyltrimethyl ammonium chloride; acrylamide; acrylamido-alkyl trialkyl ammonium salts; methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropyl-methacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in any amount useful in a base fluid sufficient to provide the desired viscosity. In some embodiments, the gelling agents may be present in an amount in the range of from an upper limit of about 10%, 9%, 8%, 7%, 6%, 5%, 4%, 3%, 2%, and 1% to a lower limit of about 0.1%, 0.2%, 0.3%, 0.4%, 0.5%, 0.6%, 0.7%, 0.8%, 0.9%, and 1% by weight of a base fluid. In other embodiments, the gelling agents may be present in an amount in the range of from about 0.15% to about 2.5% by weight of a base fluid.

In some embodiments, it may be desirable to crosslink the gelling agent with a crosslinking agent. The crosslinking agent may comprise a borate ion, a metal ion, or similar component that is capable of crosslinking at least two molecules of the gelling agent. Examples of suitable crosslinking agents include, but are not limited to, borate ions; magnesium ions; zirconium IV ions; titanium IV ions; aluminum ions; antimony ions; chromium ions; iron ions; copper ions, magnesium ions; zinc ions; and any combination thereof. These ions may additionally be provided by providing any compound that is capable of producing one or more of these ions. Examples of such compounds include, but are not limited to, ferric chloride; boric acid; disodium octaborate tetrahydrate; sodium diborate; pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; an antimony compound; a chromium compound; an iron compound; a copper compound; a zinc compound; and any combination thereof.

In certain embodiments, the crosslinking agent may be formulated to remain inactive until it is "activated" by, among other things, certain conditions in the base fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to, the type of gelling agent(s) included, the molecular weight of the gelling agent(s), the conditions in the subterranean formation being treated, the safety handling requirements, the pH of the base fluid, temperature, and/or the desired delay for the crosslinking agent to crosslink the gelling agent molecules.

When included, suitable crosslinking agents may be present in an amount sufficient to provide the desired degree of crosslinking between molecules of the gelling agent. In certain embodiments, the crosslinking agent may be present in an amount in the range of from an upper limit of about 1%, 0.9%, 0.8%, 0.7%, 0.6%, 0.5%, 0.4%, 0.3%, 0.2%, and 0.1% to a lower limit of about 0.005%, 0.01%, 0.02%, 0.3%, 0.04%, 0.05%, 0.06%, 0.07%, 0.08%, 0.09%, and 0.1% by weight of a base fluid. In other embodiments, the crosslinking agent may be present in an amount in the range of from about 0.05% to about 1% by weight of a base fluid.

The delayed-release acid, delayed acidizing reactant, delayed acidizing corresponding salt, non-degradable and degradable proppant particulates, and, non-degradable and degradable micro-proppant particulates may be introduced into the subterranean formation in a base fluid. Suitable base fluids include any fluid suitable for use in a subterranean formation, provided that it does not adversely interfere with the stability or function of any of the above mentioned components. Suitable base fluids include, but are not limited, to an oil-based fluid; an aqueous-based fluid; an aqueous-miscible fluid; a water-in-oil emulsion; an oil-in-water emulsion; and any combination thereof. Suitable oil-based fluids may include, but are not limited to, an alkane; an olefin; an aromatic organic compound; a cyclic alkane; a paraffin; a diesel fluid; a mineral oil; a desulfurized hydrogenated kerosene; and any combination thereof. Suitable aqueous-based fluids may include, but are not limited to, fresh water; saltwater (e.g., water containing one or more salts dissolved therein); brine (e.g., saturated salt water); seawater; and any combination thereof. Suitable aqueous-miscible fluids may include, but not be limited to, an alcohol (e.g., methanol, ethanol, n-propanol, isopropanol, n-butanol, sec-butanol, isobutanol, and t-butanol); a glycerin; a glycol (e.g., polyglycols, propylene glycol, and ethylene glycol); a polyglycol amine; a polyol; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any derivative thereof; any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween.

In some embodiments, the base fluid used to deliver the delayed-release acids, or delayed acidizing reactants and delayed acidizing corresponding salts, into a subterranean formation may further comprise an additive. Suitable additives may include, but are not limited to, a weighting agent; an inert solid; a fluid loss control agent; a corrosion inhibitor; a surfactant; a lost circulation material; a foaming agent; a gas; a pH control additive; a breaker; a biocide, a stabilizer, a chelating agent; a scale inhibitor; a friction reducer; a clay stabilizing agent; an acid; and any combination thereof.

In various embodiments, systems configured for delivering the delayed-release acids, or delayed acidizing reactants and delayed acidizing corresponding salts, described herein to a downhole location are described. In various embodiments, the systems can comprise a pump fluidly coupled to a tubular, the tubular containing a treatment fluid comprising the delayed-release acid and/or delayed acidizing reactant and delayed acidizing corresponding salt described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. method comprising: a) introducing a delayed acidizing reactant into a subterranean formation at a rate and pressure sufficient to create or enhance at least one first fracture in a first treatment interval; b) introducing a delayed acidizing corresponding salt into the subterranean formation at a rate and pressure sufficient to create or enhance at least one second fracture in the first treatment interval, wherein the delayed acidizing reactant is reacted with the delayed acidizing corresponding salt so as to form a delayed-release acid and etch one or more channels into a face of one selected from the group consisting of the first fracture; the second fracture; and any combination thereof; c) introducing a combination of non-degradable micro-proppant particulates and degradable micro-proppant particulates into the subterranean formation so as to place the non-degradable micro-proppant particulates and the degradable micro-proppant particulates into one selected from the group consisting of the first fracture; the second fracture; and any combination thereof, wherein the non-degradable micro-proppant particulates and the degradable micro-proppant particulates at least partially inhibit fluid flow therethrough; d) introducing a combination of non-degradable proppant particulates and degradable proppant particulates into the subterranean formation so as to place the non-degradable proppant particulates and the degradable proppant particulates into one selected from the group consisting of the first fracture; the second fracture; and any combination thereof, wherein the non-degradable proppant particulates and the degradable proppant particulates at least partially inhibit fluid flow therethrough; e) repeating (a) through (d) at a second treatment interval.

B. A method comprising: a) introducing a delayed-release acid that is encapsulated into a subterranean formation at a rate and pressure sufficient to create or enhance at least one fracture in a first treatment interval; b) releasing the delayed-release acid from the encapsulation such that the delayed-release acid etches one or more channels into a face of the at least one fracture in the first treatment interval; c) introducing a combination of non-degradable micro-proppant particulates and degradable micro-proppant particulates into the subterranean formation so as to place the non-degradable micro-proppant particulates and the degradable micro-proppant particulates into the fracture in the first treatment interval, wherein the non-degradable micro-proppant particulates and the degradable micro-proppant particulates at least partially inhibit fluid flow therethrough; d) introducing a combination of non-degradable proppant particulates and degradable proppant particulates into the subterranean formation so as to place the non-degradable proppant particulates and the degradable proppant particulates into the fracture in the first treatment interval, wherein the non-degradable proppant particulates and the degradable proppant particulates at least partially inhibit fluid flow therethrough; e) repeating (a) through (d) at a second treatment interval.

C. A method comprising: a) introducing a delayed-release acid and a gelling agent into a subterranean formation at a rate and pressure sufficient to create or enhance at least one fracture in a first treatment interval; b) contacting the delayed-release acid with a face of the fracture in the first treatment interval so as to etch one or more channels thereon; c) introducing a combination of non-degradable micro-proppant particulates and degradable micro-proppant particulates into the subterranean formation so as to place the non-degradable micro-proppant particulates and the degradable micro-proppant particulates into the fracture in the first treatment interval, wherein the non-degradable micro-proppant particulates and the degradable micro-proppant particulates at least partially inhibit fluid flow therethrough; d) introducing a combination of non-degradable proppant particulates and degradable proppant particulates into the subterranean formation so as to place the non-degradable proppant particulates and the degradable proppant particulates into the fracture in the first treatment interval, wherein the non-degradable proppant particulates and the degradable proppant particulates at least partially inhibit fluid flow therethrough; e) repeating (a) through (d) at a second treatment interval.

Each of embodiments A, B, and C may have one or more of the following additional elements in any combination:

Element 1: The method further comprising degrading the degradable micro-proppant particulates and the degradable proppant particulates.

Element 2: Wherein the non-degradable micro-proppant particulates and the degradable micro-proppant particulates are in combination present in an amount in the range of from about 0.01 ppg to about 10 ppg of a base fluid, and wherein the degradable micro-proppant particulates are present in an amount in the range of from about 20% to about 70% of the combined total volume of the non-degradable micro-proppant particulates and degradable micro-proppant particulates.

Element 3: Wherein the non-degradable proppant particulates and the degradable proppant particulates are in combination present in an amount in the range of from about 0.01 ppg to about 10 ppg of a base fluid, and wherein the degradable proppant particulates are present in an amount in the range of from about 20% to about 70% of the combined total volume of the non-degradable proppant particulates and degradable proppant particulates.

Element 4: Wherein the non-degradable micro-proppant particulates and the degradable micro-proppant particulates have an average size of less than about 100 mesh, U.S. Sieve Series.

Element 5: Wherein the delayed acidizing reactant is selected from the group consisting of a sulfonate ester; a phosphate ester; an orthoformate; an orthoacetate; a citric acid ester; and any combination thereof.

Element 6: Wherein the delayed acidizing corresponding salt is selected from the group consisting of a fluoride salt; a chloride salt; and any combination thereof.

Element 7: Wherein the delayed acidizing reactant is present in an amount in the range of from about 0.1% to about 50% by volume of a base fluid.

Element 8: Wherein the delayed acidizing corresponding salt is present in an amount in the range of from about 0.1% to about 50% by volume of a base fluid.

Element 9: Wherein the delayed-release acid is selected from the group consisting of an inorganic acid; an organic acid; acetic acid; hydrofluoric acid; hydrochloric acid; formic acid; lactic acid; phosphoric acid; sulfamic acid; p-toluenesulfonic acid; methanesulfonic acid; any derivative thereof; and any combination thereof.

Element 10: Wherein the delayed-release acid is present in an amount in the range of from about 0.1% to about 50% by volume of a base fluid.

By way of non-limiting example, exemplary combinations applicable to A, B, C include: A with 4, 5, 6, and 10; B with 2, 3, and 9; and C with 1 and 10.

To facilitate a better understanding of the embodiments disclosed herein, the following examples of representative embodiments are given. In no way should the following examples be read to limit, or to define, the scope of the invention.

EXAMPLE 1

In this example, the permeability of an etched shale core by use of the delayed-release acid according to some embodiments of the present invention was evaluated.

The shale cores used in this example were comprised of 50% quartz ($SiO_2$), 34% calcite ($CaCO_3$), 8% muscovite/illite, 5% Na-feldspar ($NaAlSi_{-3}O_8$), 2% chlorite clay, and 1% pyrite ($FeS_s$). As a control, a control shale core having dimensions of 2.54 cm×5.08 cm was subjected to permeability testing. The control shale core was saturated using API brine at room temperature and tested using nitrogen gas at a confining pressure of 1200 psi and a backpressure of 200 psi. The API brine described herein was prepared by dissolving CaCl2 (anhydrous, 10 g, 0.09 mole, 2 wt % in final solution) and NaCl (40.0 g, 0.68 mole, 8 wt % in final solution) in deionized water (450 g, 25.0 mole).

An experimental shale core sample (Core 1) having dimensions of 2.54 cm×5.08 cm was also subjected to permeability testing both before and after treatment with the delayed-release acid disclosed herein. First, Core 1 was prepared by creating artificial fractures therein by splitting the core along its axial length, so as to form two halves. The inner faces of the two halves were saturated with API brine at room temperature and thereafter reassembled for permeability testing using nitrogen gas at a confining pressure of 1200 psi and a backpressure of 200 psi, so as to obtain Core 1's permeability before treatment with a delayed release-acid.

The inner faces of Core 1 were next submerged in a 15% acetic acid solution to remove residual carbonates and other formation undesirables for 30 minutes at room temperature. Thereafter, the inner faces of Core 1 were submerged in a delayed-release acid solution of 1% hydrofluoric acid formed from a p-toluenesulfonic acid ester delayed acidizing reactant and an ammonium bifluoride delayed acidizing corresponding salt and 0.5% organic clay stabilizer for 2 hours at room temperature. The 1% hydrofluoric acid delayed-release acid solution was used to acid etch fractures in the inner faces of Core 1. Following etching, the two halves of Core 1 were reassembled for permeability testing using nitrogen gas at a confining pressure of 1200 psi and a backpressure of 200 psi, to obtain Core 1's permeability after treatment with the delayed release-acid.

TABLE 1 shows the results of the permeability testing, demonstrating that Core 1 before treatment with the delayed-release acid but comprising mechanical fractures exhibited increased permeability as compared to the control shale core and Core 1 after treatment with the delayed-release acid and comprising mechanical fractures exhibited substantially increased permeability as compared to both the control shale core and Core 1 before treatment with the delayed-release acid.

TABLE 1

| Sample | Permeability (milliDarcy) |
| --- | --- |
| Control Shale Core | 0.02 |
| Core 1 Before Treatment with the Delayed-Release Acid | 4 |
| Core 1 After Treatment with the Delayed-Release Acid | 35 |

EXAMPLE 2

In this example, the permeability of an etched shale core by use of the delayed-release acid according to some embodiments of the present invention was evaluated.

The shale cores used in this example were comprised of 50% quartz ($SiO_2$), 34% calcite ($CaCO_3$), 8% muscovite/illite, 5% Na-feldspar ($NaAlSi_{-3}O_8$), 2% chlorite clay, and 1% pyrite ($FeS_s$). As a control, a control shale core having dimensions of 2.54 cm×5.08 cm was subjected to permeability testing. The control shale core was saturated using the API brine at room temperature and tested using nitrogen gas at a confining pressure of 1200 psi and a backpressure of 200 psi.

An experimental shale core sample (Core 2) having dimensions of 2.54 cm×5.08 cm was also subjected to permeability testing both before and after treatment with the delayed-release acid disclosed herein. First, Core 2 was prepared by creating artificial fractures therein by splitting the core along its axial length, to form two halves. The inner faces of the two halves were saturated with the API brine at room temperature and thereafter reassembled for permeability testing using nitrogen gas at a confining pressure of 1200 psi and a backpressure of 200 psi, so as to obtain Core 2's permeability before treatment with a delayed release-acid.

The inner faces of Core 2 were next submerged in a 10% hydrochloric acid solution so as to remove residual carbonates and other formation undesirables for 30 minutes at room temperature. Thereafter, the inner faces of Core 2 were submerged in a delayed-release acid solution of 1% hydrofluoric acid formed from a hydrochloric acid and an ammonium bifluoride corresponding salt and 0.5% organic clay stabilizer for 2 hours at room temperature. The 1% hydrofluoric acid delayed-release acid solution was used to acid etch fractures in the inner faces of Core 2. Following etching, the two halves of Core 2 were reassembled for permeability testing using nitrogen gas at a confining pressure of 1200 psi and a backpressure of 200 psi, so as to obtain Core 2's permeability after treatment with the delayed release-acid.

TABLE 2 shows the results of the permeability testing, demonstrating that Core 2 before treatment with the delayed-release acid but comprising mechanical fractures exhibited increased permeability as compared to the control shale core and Core 2 after treatment with the delayed-release acid and comprising mechanical fractures exhibited substantially increased permeability as compared to both the control shale core and Core 2 before treatment with the delayed-release acid.

TABLE 2

| Sample | Permeability (milliDarcy) |
| --- | --- |
| Control Shale Core | 0.02 |
| Core 2 Before Treatment with the Delayed-Release Acid | 5 |
| Core 2 After Treatment with the Delayed-Release Acid | 1500 |

EXAMPLE 3

In this example, the permeability of an etched shale core by use of the delayed-release acid according to some embodiments of the present invention was evaluated at elevated temperatures.

The shale cores used in this example were comprised of 50% quartz ($SiO_2$), 34% calcite ($CaCO_3$), 8% muscovite/illite, 5% Na-feldspar ($NaAlSi_{-3}O_8$), 2% chlorite clay, and 1% pyrite ($FeS_s$). An experimental shale core sample (Core 3) having dimensions of 2.54 cm×5.08 cm was subjected to permeability testing both before and after treatment with the delayed-release acid disclosed herein. First, Core 3 was prepared by creating artificial fractures therein by splitting the core along its axial length, so as to form two halves. The inner faces of the two halves were saturated with the API brine at 50° C. (122° F.) and thereafter reassembled for permeability testing using nitrogen gas at a confining pressure of 1200 psi and a backpressure of 200 psi, so as to obtain Core 3's permeability before treatment with a delayed release-acid.

The inner faces of Core 3 were next submerged in a 10% hydrochloric acid solution so as to remove residual carbonates and other formation undesirables for 30 minutes at 50° C. (122° F.). Thereafter, the inner faces of Core 3 were submerged in a delayed-release acid solution of 1% hydrofluoric acid formed from a methanesulfonic acid delayed acidizing reactant (formed from the hydrolysis of a methyl methanesulfonate ester) and an ammonium bifluoride delayed acidizing corresponding salt, and 5% methyl glycine diacetic acid trisodium salt chelating agent for approximately 24 hours at 50° C. (122° F.). The 1% hydrofluoric acid delayed-release acid solution was used to acid etch fractures in the inner faces of Core 3. Following etching, the two halves of Core 3 were reassembled for permeability testing using nitrogen gas at a confining pressure of 1200 psi and a backpressure of 200 psi at room temperature, so as to obtain Core 3's permeability after treatment with the delayed release-acid.

TABLE 3 shows the results of the permeability testing, demonstrating that Core 3 after treatment with the delayed-release acid exhibited substantially increased permeability as compared to Core 3 before treatment with the delayed-release acid.

TABLE 3

| Sample | Permeability (milliDarcy) |
| --- | --- |
| Core 3 Before Treatment with the Delayed-Release Acid | 0.92 |
| Core 3 After Treatment with the Delayed-Release Acid | 7.9 |

Therefore, the embodiments disclosed herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
   a) introducing a delayed acidizing reactant into a subterranean formation at a rate and pressure sufficient to create or enhance at least one first fracture in a first treatment interval;

b) introducing a delayed acidizing corresponding salt into the subterranean formation at a rate and pressure sufficient to create or enhance at least one second fracture in the first treatment interval,
wherein the delayed acidizing reactant is reacted with the delayed acidizing corresponding salt so as to form a delayed-release acid and etch one or more channels into a face of one selected from the group consisting of the at least one first fracture; the at least one second fracture; and any combination thereof;
c) introducing a combination of non-degradable micro-proppant particulates and degradable micro-proppant particulates having an average size of less than about 100 mesh, U.S. Sieve Series into the subterranean formation so as to place the non-degradable micro-proppant particulates and the degradable micro-proppant particulates into one selected from the group consisting of the at least one first fracture; the at least one second fracture; and any combination thereof,
wherein the non-degradable micro-proppant particulates and the degradable micro-proppant particulates at least partially inhibit fluid flow therethrough;
d) after step c), introducing a combination of non-degradable proppant particulates and degradable proppant particulates having an average size of greater than about 100 mesh up to about 2 mesh, U.S. Sieve Series into the subterranean formation so as to place the non-degradable proppant particulates and the degradable proppant particulates into one selected from the group consisting of the at least one first fracture; the at least one second fracture; and any combination thereof,
wherein the non-degradable proppant particulates and the degradable proppant particulates at least partially inhibit fluid flow therethrough;
e) repeating (a) through (d) at a second treatment interval.

2. The method of claim 1, further comprising degrading the degradable micro-proppant particulates and the degradable proppant particulates.

3. The method of claim 1, wherein the non-degradable micro-proppant particulates and the degradable micro-proppant particulates are in combination present in an amount in the range of from about 0.01 ppg to about 10 ppg of a base fluid, and wherein the degradable micro-proppant particulates are present in an amount in the range of from about 20% to about 70% of the combined total volume of the non-degradable micro-proppant particulates and degradable micro-proppant particulates.

4. The method of claim 1, wherein the non-degradable proppant particulates and the degradable proppant particulates are in combination present in an amount in the range of from about 0.01 ppg to about 10 ppg of a base fluid, and wherein the degradable proppant particulates are present in an amount in the range of from about 20% to about 70% of the combined total volume of the non-degradable proppant particulates and degradable proppant particulates.

5. The method of claim 1, wherein the delayed acidizing reactant is selected from the group consisting of a sulfonate ester; a phosphate ester; an orthoformate; an orthoacetate; a citric acid ester; and any combination thereof.

6. The method of claim 1, wherein the delayed acidizing corresponding salt is selected from the group consisting of a fluoride salt; a chloride salt; and any combination thereof.

7. The method of claim 1, wherein the delayed acidizing reactant is present in an amount in the range of from about 0.1% to about 50% by volume of a base fluid.

8. The method of claim 1, wherein the delayed acidizing corresponding salt is present in an amount in the range of from about 0.1% to about 50% by volume of a base fluid.

9. The method of claim 1, wherein the delayed-release acid is selected from the group consisting of an inorganic acid; an organic acid; acetic acid; hydrofluoric acid; hydrochloric acid; formic acid; lactic acid; phosphoric acid; sulfamic acid; p-toluenesulfonic acid; any derivative thereof; and any combination thereof.

10. A method comprising:
a) introducing a delayed acidizing reactant into a subterranean formation at a rate and pressure sufficient to create or enhance at least one first fracture in a first treatment interval,
wherein the delayed acidizing reactant is selected from the group consisting of a sulfonate ester; a phosphate ester; an orthoformate; an orthoacetate; a citric acid ester; and any combination thereof;
b) introducing a delayed acidizing corresponding salt into the subterranean formation at a rate and pressure sufficient to create or enhance at least one second fracture in the first treatment interval,
wherein the delayed acidizing reactant is reacted with the delayed acidizing corresponding salt so as to form a delayed-release acid and etch one or more channels into a face of one selected from the group consisting of the at least one first fracture; the at least one second fracture; and any combination thereof;
c) introducing a combination of non-degradable micro-proppant particulates and degradable micro-proppant particulates having an average size of less than about 100 mesh, U.S. Sieve Series into the subterranean formation so as to place the non-degradable micro-proppant particulates and the degradable micro-proppant particulates into one selected from the group consisting of the at least one first fracture; the at least one second fracture; and any combination thereof,
wherein the non-degradable micro-proppant particulates and the degradable micro-proppant particulates at least partially inhibit fluid flow therethrough;
d) after step c), introducing a combination of non-degradable proppant particulates and degradable proppant particulates having an average size of greater than about 100 mesh up to about 2 mesh, U.S. Sieve Series into the subterranean formation so as to place the non-degradable proppant particulates and the degradable proppant particulates into one selected from the group consisting of the at least one first fracture; the at least one second fracture; and any combination thereof,
wherein the non-degradable proppant particulates and the degradable proppant particulates at least partially inhibit fluid flow therethrough;
e) repeating (a) through (d) at a second treatment interval.

11. The method of claim 10, further comprising degrading the degradable micro-proppant particulates and the degradable proppant particulates.

12. The method of claim 10, wherein the non-degradable micro-proppant particulates and the degradable micro-proppant particulates are in combination present in an amount in the range of from about 0.01 ppg to about 10 ppg of a base fluid, and wherein the degradable micro-proppant particulates are present in an amount in the range of from about 20% to about 70% of the combined total volume of the non-degradable micro-proppant particulates and degradable micro-proppant particulates.

13. The method of claim 10, wherein the non-degradable proppant particulates and the degradable proppant particulates are in combination present in an amount in the range of from about 0.01 ppg to about 10 ppg of a base fluid, and wherein the degradable proppant particulates are present in an amount in the range of from about 20% to about 70% of the combined total volume of the non-degradable proppant particulates and degradable proppant particulates.

14. The method of claim 10, wherein the delayed acidizing corresponding salt is selected from the group consisting of a fluoride salt; a chloride salt; and any combination thereof.

15. The method of claim 10, wherein the delayed acidizing reactant is present in an amount in the range of from about 0.1% to about 50% by volume of a base fluid.

16. The method of claim 10, wherein the delayed acidizing corresponding salt is present in an amount in the range of from about 0.1% to about 50% by volume of a base fluid.

17. A method comprising:
a) introducing a delayed acidizing reactant into a subterranean formation at a rate and pressure sufficient to create or enhance at least one first fracture in a first treatment interval;
b) introducing a delayed acidizing corresponding salt into the subterranean formation at a rate and pressure sufficient to create or enhance at least one second fracture in the first treatment interval,
wherein the delayed acidizing reactant is reacted with the delayed acidizing corresponding salt so as to form a delayed-release acid and etch one or more channels into a face of one selected from the group consisting of the at least one first fracture; the at least one second fracture; and any combination thereof and,
wherein the delayed acidizing corresponding salt is selected from the group consisting of a fluoride salt; a chloride salt; and any combination thereof;
c) introducing a combination of non-degradable micro-proppant particulates and degradable micro-proppant particulates having an average size of less than about 100 mesh, U.S. Sieve Series into the subterranean formation so as to place the non-degradable micro-proppant particulates and the degradable micro-proppant particulates into one selected from the group consisting of the at least one first fracture; the at least one second fracture; and any combination thereof,
wherein the non-degradable micro-proppant particulates and the degradable micro-proppant particulates at least partially inhibit fluid flow therethrough;
d) after step c), introducing a combination of non-degradable proppant particulates and degradable proppant particulates having an average size of greater than about 100 mesh up to about 2 mesh U.S. Sieve Series into the subterranean formation so as to place the non-degradable proppant particulates and the degradable proppant particulates into one selected from the group consisting of the at least one first fracture; the at least one second fracture; and any combination thereof,
wherein the non-degradable proppant particulates and the degradable proppant particulates at least partially inhibit fluid flow therethrough;
e) repeating (a) through (d) at a second treatment interval.

18. The method of claim 17, wherein the delayed acidizing corresponding salt is present in an amount in the range of from about 0.1% to about 50% by volume of a base fluid.

* * * * *